US010313937B2

(12) United States Patent
da Silva et al.

(10) Patent No.: US 10,313,937 B2
(45) Date of Patent: Jun. 4, 2019

(54) USE OF PREDICTION MODEL OF THE QUALITY OF SERVICE IN A TARGET CELL TO TRIGGER A HANDOVER

(71) Applicant: Telefonaktiebolaget LM Ericsson (publ), Stockholm (SE)

(72) Inventors: Icaro L. J. da Silva, Solna (SE); Steven Corroy, Järfälla (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 62 days.

(21) Appl. No.: 15/524,523

(22) PCT Filed: Nov. 5, 2014

(86) PCT No.: PCT/SE2014/051309
§ 371 (c)(1),
(2) Date: May 4, 2017

(87) PCT Pub. No.: WO2016/072894
PCT Pub. Date: May 12, 2016

(65) Prior Publication Data
US 2017/0325138 A1 Nov. 9, 2017

(51) Int. Cl.
*H04W 36/00* (2009.01)
*H04W 36/30* (2009.01)
(Continued)

(52) U.S. Cl.
CPC ....... *H04W 36/0083* (2013.01); *H04W 16/22* (2013.01); *H04W 36/00837* (2018.08); *H04W 36/30* (2013.01); *H04W 92/20* (2013.01)

(58) Field of Classification Search
CPC . H04W 36/0083; H04W 16/22; H04W 36/30; H04W 92/20
See application file for complete search history.

(56) References Cited

U.S. PATENT DOCUMENTS

2003/0112766 A1\* 6/2003 Riedel ................. H04L 12/5695
370/252
2005/0239465 A1\* 10/2005 Lee ....................... H04W 36/26
455/436
(Continued)

FOREIGN PATENT DOCUMENTS

EP 2768256 A1 8/2014

OTHER PUBLICATIONS

3GPP, "3rd Generation Partnership Project; Technical Specification Group Radio Access Network; Evolved Universal Terrestrial Radio Access Network (E-UTRAN); X2 application protocol (X2AP) (Release 12)", 3GPP TS 36.423 V12.2.0, Jun. 2014, 1-151.
(Continued)

*Primary Examiner* — Afshawn M Towfighi
(74) *Attorney, Agent, or Firm* — Murphy, Bilak & Homiller, PLLC

(57) ABSTRACT

A method and a first radio network node (110) for managing input parameters to a set of models for prediction of a quality of service of a user equipment (120) are disclosed. The first radio network node (110) operates the set of models for prediction of the quality of service. The quality of service relates to when the user equipment (120) is served by a second radio network node (130) after a handover from the first radio network node (110) to the second radio network node (130). The first radio network node (110) configures (205) the second radio network node (130) to report the input parameters at least once before the handover. The input parameters are usable by the first radio network node (110) when predicting, by use of the set of models, the quality of service. A corresponding computer program and a carrier therefor are also disclosed.

20 Claims, 6 Drawing Sheets

(51) Int. Cl.
*H04W 16/22* (2009.01)
*H04W 92/20* (2009.01)

(56) References Cited

U.S. PATENT DOCUMENTS

2006/0029021 A1 2/2006 Sakawa et al.
2009/0312021 A1* 12/2009 Kim .................... H04W 36/02
455/436

OTHER PUBLICATIONS

Unknown, Author, "Enabling selection of handover target based on OoS monitoring", 3GPP TSG.RAN WG3 Meeting #84, R3-141113, Seoul, Republic of Korea, May 19-23, 2014, 1-3.
Unknown, Author, "Parameters Exchanged from the WLAN to the eNB", Ericsson, 3GPP TSG-RAN WG3 #85, R3-142023, Dresden, Germany, Aug. 18-22, 2014, 1-2.
Unknown, Author, "Way forward on Multi-RAT Joint Coordination", 3GPP TSG-RAN3 Meeting #84, R3-141512, CMCC, Seoul, Korea, May 19-23, 2014, 1-3.

* cited by examiner

USE OF PREDICTION MODEL OF THE QUALITY OF SERVICE IN A TARGET CELL TO TRIGGER A HANDOVER

TECHNICAL FIELD

Embodiments herein relate to wireless communication systems, such as cellular radio communication systems. In particular, a method and a first radio network node for managing input parameters to a set of models for prediction of a quality of service of a user equipment are disclosed. A corresponding computer program and a carrier therefor are also disclosed.

BACKGROUND

In cellular radio communication systems, such as mobile networks, a process known as handover is used to provide e.g. mobility for a user equipment (UE) and load balancing between two base stations. The handover is typically signified by that the user equipment is served by one of the base stations, aka a source base station, before the handover and by the other base station, aka a target base station, after the handover.

In order for the source base station to be able to take a decision about that the handover should be performed, it may make a prediction about quality of service for the user equipment. The prediction concerns quality of service as when the user equipment would be served by the target base station.

The prediction is performed by use of one or more Performance Prediction Models (PPMs). For example, a first PPM may be given by a function f and a second PPM may be given by a function h. Thus, for the first PPM, a predicted performance, such as a predicted throughput, PPM_1= f (p1, . . . , pN). Here, p1, . . . , pN are input parameters, which defines a given network condition of the mobile network. For example, p1 is Reference Signal Received Power (RSRP), p2 is Reference Signal Received Quality (RSRQ) and p3 is the network load in terms of resource block utilization per Transmission Time Interval. An exemplifying prediction model may use linear interpolation to find the predicted performance.

In an exemplifying algorithm for taking the decision about the handover, the predicted performance (PPM_target) at the target base station is compared to a Measured Performance (MP) at the source base station, e.g. MP_source, and the handover should be performed if the predicted throughput at the target base station, i.e. PPM_target, exceeds the one measured in the source base station, i.e. MP_source.

The source base station thus has to obtain the input parameters p1, . . . , pN associated to the target base station, e.g. via an inter-base station interface, in order to feed its model, e.g. the PPM_1, and compute the PPM_target, i.e. the predicted throughput.

Throughput prediction may be solved in various manners by different vendors that provide radio access network nodes, such as base station, eNBs, etc. This means that different base stations, e.g. from different companies, may have different prediction models that require different subsets of the input parameters p1, . . . , pN. In some cases, the model of a given vendor only needs p1, p2 while the model of another vendor requires p1, p4, p5 . . . pN. More explicitly, different number of input parameters are required for models of different vendors.

A standardization of which input parameters should be reported may enable base stations from different vendors to be able to cooperate. A traditional way of standardizing is to define that all the input parameters that are relevant to all the vendors should be reported. As a result, those input parameters that are required by a model of a specific vendor will always be available, since all input parameters that possibly could be required by any model should be reported.

As an alternative solution, a minimum set of input parameters common to models of all vendors could be required to be reported. Then, additional reporting would in some, or even in many cases, be required in order to provide the required input parameters for a specific model of some certain vendor. If the additional reporting is not performed, the specific model cannot be used.

A problem with the traditional way is that an interface between e.g. a source base station and a target base station may be heavily loaded by the vast number of input parameters that are to be reported. This problem may be solved by the alternative solution above. However, the alternative solution suffers from the drawback that additional measurements and reports will need to be performed in many cases or else the model cannot be used.

SUMMARY

An object may be to eliminate, or at least reduce, the above mentioned problem and/or the above mentioned drawback.

According to a first aspect, the object is achieved by a method, performed by a first radio network node, for managing input parameters to a set of models for prediction of a quality of service of a user equipment. The first radio network node operates the set of models for prediction of the quality of service. The quality of service relates to when the user equipment is served by a second radio network node after a handover from the first radio network node to the second radio network node. The first radio network node configures the second radio network node to report the input parameters at least once before the handover. The input parameters are usable by the first radio network node when predicting, by use of the set of models, the quality of service.

According to a second aspect, the object is achieved by a first radio network node configured to manage input parameters to a set of models for prediction of a quality of service of a user equipment. The first radio network node is capable of operating the set of models for prediction of the quality of service. The quality of service relates to when the user equipment is served by a second radio network node after a handover from the first radio network node to the second radio network node. The first radio network node is configured to configure the second radio network node to report the input parameters at least once before the handover. The input parameters are usable by the first radio network node when predicting, by use of the set of models, the quality of service.

According to further aspects, the object is achieved by a computer program and a carrier for the computer program corresponding to the aspects above.

According to embodiments herein an amount of information, i.e. in terms of the input parameters, transmitted between the first and second radio network nodes may be reduced by specifying the input parameters, or a subset thereof, to be transmitted between the first and second radio network node. The specifying of the input parameters is performed in connection with handover based on Quality Of Service (QoS), to provide e.g. mobility or load balancing.

An advantage is that resources, such as bandwidth, bit rate or the like, required for the transmission of the input parameters are saved.

Moreover, a further advantage is that embodiments herein enable the first radio network node to configure the reporting of input parameters according to its own specific set of models. Such own specific set of models, such as the PPM mentioned above, may rely on only a subset of all input parameters that the second radio network node is able to report.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
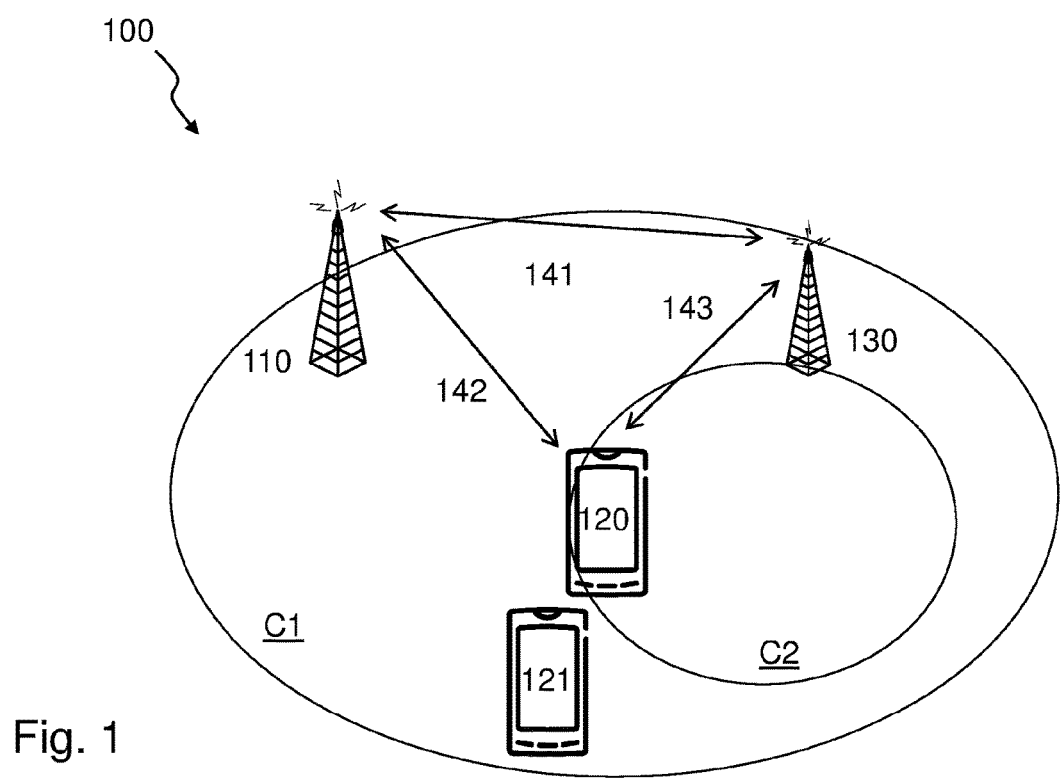
FIG. 1 is a schematic overview of an exemplifying wireless communication system in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 depicts an exemplifying wireless communication system 100 in which embodiments herein may be implemented. In this example, the wireless communication system 100 is a Long Term Evolution (LTE) network. In other examples, the wireless communication system 100 may be any cellular or wireless communication system, such as a Global System for Mobile Communications (GSM) system, a Code Division Multiple Access (CDMA) system, a Universal Mobile Telecommunication System (UMTS) and a Worldwide Interoperability for Microwave Access (WiMAX) system, a Wireless Local Area Network (WLAN), a wireless network according to 802.11-standards suite or the like.

The wireless communication system 100 comprises a first radio network node 110, such as a source radio network node, and a second radio network node 130, such as a target radio network node.

Moreover, the wireless communication system 100 comprises one or more user equipments 120, 121. One or more of said user equipments 120, 121 may be located in a first cell C1 or in a second cell C2. The first cell C1 may be operated by the first radio network node 110 and the second cell C2 may be operated by the second radio network node 130. The first radio network node 110 may serve a plurality of user equipments 120, 121, including the user equipment 120.

The first radio network node 110 may communicate 141, e.g. send information to and/or receive information from, with the second radio network node 130. The communication 141 may be performed via an X2 interface in case of LTE. In case of a multi-Radio Access Technology (RAT) scenario, or inter-RAT scenario, a Radio Access Network (RAN) Information Message (RIM) interface between e.g. a eNB, such as the first radio network node 110, and a Radio Network Controller (RNC), such as the second radio network node 130, may be employed.

The first radio network node 110 may communicate 142, e.g. send information to and/or receive information from, the one or more user equipments 120, 121. The communication 142 may be performed via a uU interface in case of LTE.

The second radio network node 130 may communicate 143, e.g. send information to and/or receive information from, the one or more user equipments 120, 121. The communication 143 may be performed via a uU interface in case of LTE.

In various embodiments, the above illustrated scenario may be an inter-RAT scenario, an intra-RAT scenario, a multi-RAT scenario or the like.

As used herein, the term "radio network node" may refer to an evolved Node B (eNB), a Radio Network Controller (RNC), a Radio Base Station (RBS), a base station, a base station controller, a control node controlling one or more Remote Radio Units (RRUs) or one or more base stations, an access point or the like.

As used herein, the term "user equipment" may refer to a wireless device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the user equipment.

Figure 2:
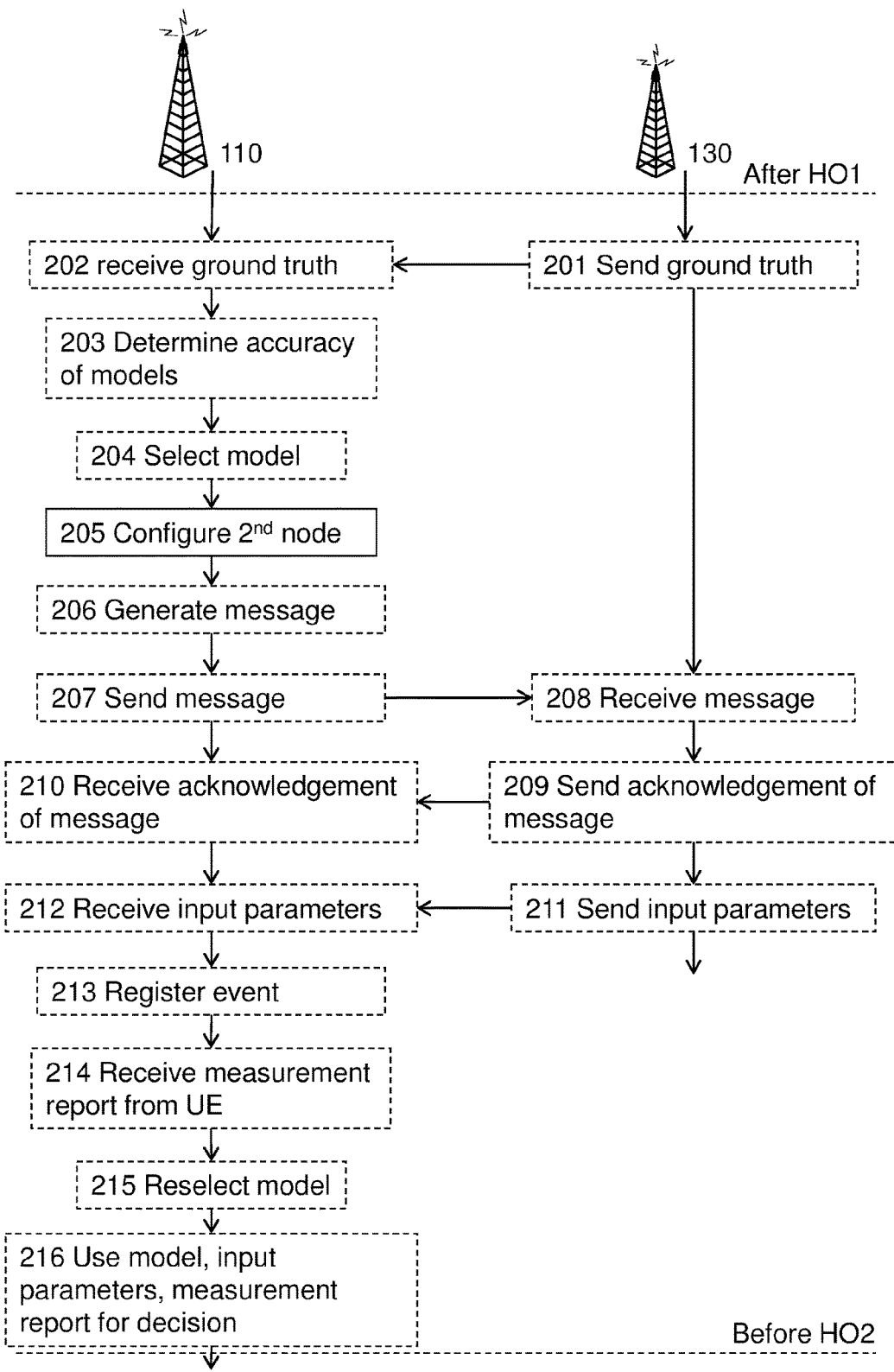
FIG. 2 is a schematic combined signaling and flowchart illustrating embodiments herein.

FIG. 2 depicts an exemplifying method according to embodiments herein when performed in the wireless communication system 100 of FIG. 1. Thus, the first radio network node 110 performs a method for managing input parameters to a set of models for prediction of a quality of service of the user equipment 120.

The first radio network node 110 operates the set of models for prediction of the quality of service. The quality of service relates to when the user equipment 120 is served by a second radio network node 130 after a handover from the first radio network node 110 to the second radio network node 130.

The quality of service may comprise one or more of:

a throughput value relating to throughput of transmission between the second radio network node 130 and the user equipment 120;

a delay value relating to delay of transmission between the second radio network node 130 and the user equipment 120;

a packet loss rate relating to loss of packets in transmission between the second radio network node 130 and the user equipment 120;

a packet error rate relating to error in packets of transmission between the second radio network node 130 and the user equipment 120;

a reliability value relating to reliability of a connection carrying transmission between the second radio network node 130 and the user equipment 120; and the like.

The throughput value may comprise an uplink throughput value relating to throughput from the user equipment 120 to the second radio network node 130 and/or a downlink throughput value relating to throughput from the second radio network node 130 to the user equipment 120.

As mentioned in the background section, the handover may be caused by overload at the first radio network node 110, or the handover may be caused by mobility of the user equipment 120. The cause of the handover may be indicated by the event described in action 213 below.

Initially, an initial handover HO1 of a further user equipment (not shown) may have taken place. The further user equipment may have been handed over from the first radio network node 110 to the second radio network node 130. When a decision, concerning which user equipment and which target radio network node the hand over should involve, was made a certain model out of the set of models was used to provide a predicted quality of service. See FIG. 3 for more details concerning message sent at handover.

One or more of the following actions may be performed in any suitable order.

Action 201

In some examples, it may be desired to check the accuracy of the certain model, and/or further models out of the set of models. Therefore, the second radio network node 130 may measure quality of service, or a quality of service value, achieved for the further user equipment served by the second radio network node 130. See also action 308 of FIG. 3.

Subsequently, the second radio network node 130 may send a ground truth indicating the measured quality of service.

Action 202

After action 201, the first radio network node 110 may thus receive the ground truth corresponding to the quality of service to be predicted by use of the set of models. This means that the ground truth represents a target value, or a desired value, relating to the quality of service. It is this ground truth that the set of models attempts to predict, or estimate.

Action 203

In order to qualify accuracy of the different models, the first radio network node 110 may determine a respective value of accuracy for each of the models based on a difference between the ground truth and a respective quality of service predicted by use of a corresponding model, e.g. from among the set of models.

The respective value of accuracy may be weighted in dependence of a number of input parameters for the corresponding model.

For example, a first model takes three input parameters and a second model takes four input parameters. In terms of consumed bandwidth, e.g. between the first and second radio network node 110, 130, the first model may be preferred. Therefore, in case the respective values of accuracy for the first and second models are equal, $v_1=v_2=v$, a weighting thereof would yield the respective value of accuracy of the second model, e.g. $4*v_2$, to become greater than the respective value of accuracy of the first model, e.g. $3*v_1$.

Action 204

Now the first radio network node 110 may select at least one corresponding model based on the respective value of accuracy. This may mean, in case a higher value of accuracy is better a lower value of accuracy, that the respective value of accuracy for the selected corresponding model is above a threshold value for accuracy of model.

For example, the threshold value for accuracy of model may be 90%, which means that the predicted quality of service value is not more than 10% off from the ground truth, e.g. not more than 10% higher or lower than the ground truth. In this example, the accuracy may thus be measured in relative terms, i.e. the difference is determined as a ratio between the predicted quality of service and the ground truth. However, in other examples, the accuracy may be measured in absolute terms, i.e. the difference is determined as a subtraction of the predicted quality of service from the ground truth.

Accordingly, the subset of input parameters may be selected based on a tradeoff between the number of input parameters for each of the set of models and a respective accuracy of each model, while keeping a certain level of accuracy.

As a further example, the first radio network node 110 may be provided with a set of models M_1 ... M_K, where each model is associated with a subset of the input parameters and respective prediction errors e1 ... eK. The first radio network node 110 may then select the model, which provides the best, or almost best, compromise between prediction error and amount of information, e.g. a total size in bits of input parameters, to be transmitted to predict the quality of service. Upon the selection of the model, the input parameters needed by the model are determined. The first radio network node 110 may then configure, see e.g. action 205 below, the second radio network node 130 to report only those input parameters associated to the selected model.

Now, in yet more detail, the first radio network node 110 may have a first set of models that it may use for prediction of the quality of service. The first set of models may be M_1, M_2, ..., M_K, where each model has a different set of input parameters, or features, f_1, f_2, ..., f_K such that
f_i={f_i1, f_i2, f_in},
where n is the number of features of model M_i.

Each model M_K is associated with an error metric e_1, e_2, ..., e_K that represents the accuracy of the model. The accuracy of the same model may be different in different locations and varies in the same location at different times.

The first set of models and the accuracy of each model of the first set may thus be exemplified by:
M1=>f_1{f_11, f_12, f_13, f_14, f_15}=>e_1
M_2=>f_2{f_21, f_22, f_23, f_24}=>e_2
M_3=>f_3{f_31, f_32, f_33}=>e_3
M4=>f_4{f_41, f_42}=>e4

The first radio network node 110 may rank each of its models M_K from best to worse accuracy while sorting based on e_K. Alternatively or additionally, the first radio network node 110 set a rank indicator R by use of a weighted sum to balance number of features and accuracy as
R=w_1*number of input parameters+w_2*accuracy,
where w_j (j=1,2) are weights for balancing number of input parameters to accuracy of model.

This may enable a trade-off between a large number of input parameters and a good accuracy.

As an alternative, the number of input parameters may be modified to the amount of information to be communicated between the first and second radio network node 110, 130. Sometimes, it may be better to have a slightly worse accuracy if the number of input parameters is reduced, or even greatly reduced.

After ranking, i.e. the setting of the rank indicator R, its models, the first radio network node 110 may send a message for requesting input parameter reporting, as in e.g. action 205 and/or action 206 and 207, to the second radio network node 130. The message specifies the set of input parameters that may be reported, or sent, corresponding to the best model according to the previous ranking. See action 211.

Alternatively, the model with fewest number of input parameters for which accuracy is above a threshold value may be selected. The message may then indicate the input parameters corresponding to that model.

Continuing with the example above, when accuracy is given as an error, if $e\_1=10^\wedge-1$, $e\_2=10^\wedge-2$, $e\_3=10^\wedge-3$, $e\_4=10^\wedge-2$, then only $f\_31$, $f\_32$, $f\_33$ should be reported since the error of M_3 is the least. Now that error is given it is desired to have small value as opposed to when accuracy is given, for which high values represent accurate, and good, models.

The error, or accuracy, of the selected model may then be updated based on the ground truth send in e.g. action 201.

Models that are selected rarely may have an outdated error and/or accuracy measure. To tackle that, the second radio network node 130 may regularly report all possible input parameters, regardless of which model currently is selected. In this manner, the first radio network node 110 may update accuracy of each model. Periodicity of reporting all available input parameters is a balance between traffic load between the first and second radio network nodes 110, 130 and reliability of accuracy of models. Here, it is assumed that when accuracy of a model has not been calculated for a certain time its reliability is considered to be low.

Action 205

In order to make the second radio network node 130 aware of which input parameters the first radio network node 110 wishes to receive, the first radio network node 110 configures the second radio network node 130 to report the input parameters at least once before the handover. The input parameters are usable by the first radio network node 110 when predicting, by use of the set of models, the quality of service. The input parameters may comprise one or more of:
- a load parameter relating to load in the second radio network node 130,
- a capability information relating to capability of the user equipment 120,
- a channel quality indicator parameter relating to one or more channel quality indicators reported by the user equipment 120,
- a rank parameter relating to rank a connection to the user equipment 120,
- a signal strength parameter relating to received signal strength reported by the user equipment 120,
- an amount parameter relating to an amount of user equipments served by the first radio network node 110,
- a resource parameter relating to utilization of physical resource blocks,
- a bearer parameter relating to a bearer type of a bearer associated to the user equipment 120, and the like.

In this context, the input parameters may be those input parameters required by the set of models. Here, the set of models refers to those models which the first radio network node 110 operates. This thus means that the input parameter may in fact be a subset of input parameters that the second radio network node 130 is capable of reporting.

In a special case, the second radio network node 130 may be the user equipment 120, 121. This means that the first radio network node 110 configures the user equipment 120, 121 to report the input parameters.

Action 205 may include action 206 and 207.

Action 206

The first radio network node 110 may generate a message indicating the input parameters to be reported by the second radio network node 130. This means that the first radio network node 110 merely considers which input parameters are required by the set of models. That is to say, the first radio network node 110 may use any model out of the set of models since the message indicates all input parameters that the first radio network node 110 needs in order to execute the set of models.

In an example, the first radio network node 110 may generate the message by restricting the message to indicate only a subset of the input parameters. In this example, the subset of the input parameters may be given by the selected at least one corresponding model as in action 204 above.

The message may include one or more of:
- an indication representing a specific set of input parameters,
- one indication for each input parameter to be reported by the second radio network node 130;
- a respective name of each input parameter to be reported by the second radio network node 130; and the like.

As an example relating to the indication representing the specific set of input parameters, the sending of the message in order to configure the second radio network node 130 may be performed using pre-defined modes, where each mode is associated with a pre-defined index, or the indication, and to a subset of input parameters. E.g. p1→(associated with) index=1, p2→index=2 . . . (p1,pN) index=N+1, etc. A table that maps indexes to an input parameter subset out of p1, . . . , pN may be known to both the first and second radio network nodes 110, 130. This means that the indication may be known, e.g. by pre-configuration, semi-static configuration or the like, to both the first and second radio network nodes 110, 130.

In another example, the sending of the message may include the parameters to be transmitted explicitly by including a list of the parameters. This example is similar to when the message includes the respective name of each input parameter.

Action 207

The first radio network node 110 may send the message to the second radio network node 130, thereby configuring the second radio network node 130 to report the input parameters at least once before the handover.

Action 208

The second radio network node 130 may receive the message from the first radio network node 110. Subsequently, the second radio network node 130 acts according to the message, e.g. performs at least one measurement and/or calculation to obtain the input parameters to be reported in action 211. Thus, this may mean that the second radio network node 130 becomes configured. An advantage may be than the second radio network node 130 may only need to perform that at least one measurement and/or calculation, which yields at least one of the input parameters that is to be reported.

Action 209

The second radio network node 130 may send, to the first radio network node 110, an acknowledgment of the message. This means that the second radio network node 130 confirms to the first radio network node 110 that the configured input parameters are to be reported.

Action 210

The first radio network node 110 may receive, from the second radio network node 130, the acknowledgment. Thus, the first radio network node 110 will, unless errors occur, be able to use the model selected in action 204 in an upcoming handover.

Action 211

The second radio network node 130 may send the input parameters to the first radio network node 110.

Action 212

In order for the first radio network node 110 to be able to use the model selection in action 204, the first radio network node 110 may receive the input parameters from the second radio network node 130.

Action 213

The first radio network node 110 may register an event for triggering sending, by the user equipments 120, 121, of measurement reports, wherein the measurement reports may be used in a decision concerning which user equipment 120, 121 and which second radio network 130 node to involve in the handover.

The event may indicate overload of the first radio network node 110, or the event may indicate that signal strength received at, or by, at least one user equipment 120, 121 is below a threshold value. As an example relating to 3GPP terminology for LTE, the event may be a mobility factor, such as sMeasure, A1-A5, or the like.

Action 214

The first radio network node 110 may receive at least one measurement report from the user equipment 120, 121.

Action 215

In some cases, e.g. due to errors, it may happen that the input parameters for selected model, or selected models, are not available.

Then, the first radio network node 110 may reselect at least one reselected corresponding model out of the set of models according to number of input parameters and type of input parameters among the received input parameters.

Action 216

Now that action 212 and 214 have been performed, the first radio network node 110 may use the at least one selected corresponding model, the input parameters and the measurement report when making the decision. In this manner, the first radio network node 110 may select at least one user equipment and a respective target to which said at least one user equipment is to be handed over.

In case action 215 has been performed, the use of the reselected model may comprise using the at least one reselected corresponding model, the input parameters and the measurement report when making the decision.

The input parameters p1 pN may be static and associated to the wireless communication network 100 or the user equipment 120. Examples of static input parameters include UE capabilities, cell frequency band, cell identity, subscription information, etc. The input parameter may also be dynamic, for example radio measurements at the first radio network node 110, such as RSRP, RSRQ, Reference Signal Strength Indicator (RSSI), Energy per chip over noise (Ec/No), Received Signal Code Power (RSCP), or any other type of radio measurement.

The input parameter may also include load information, such as resource block utilization in the case of LTE, code/power utilization in UMTS, or any of the listed BSS load metrics or WAN metrics, such as the number of STAs, the channel utilization, the available admission capacity, the uplink/downlink speed, the downlink/uplink loads. In the case of LTE, further input parameters may be found in the following list:

1. Number of active/schedulable users per TTI, i.e. 1 ms.
2. Number of scheduled users per TTI.
3. Number of remaining Physical Resource Blocks (PRBs) after scheduling per TTI, 50 MHz=50 PRBs.
4. Total number of bits in the downlink buffers for all users per TTI.
5. Current average throughput for active users in the cell, e.g. in Mbps, active means in TT's where the user is scheduled but still have data left in its buffer.
6. Current total cell throughput, Mbps.
7. Signal-to-Interference-Ratio (SINR) for the user equipment 120, dBm, an estimation made by the eNB about the signal quality in the downlink, partly based on the Channel Quality Indicator (CQI) reported by the user equipment 120.
8. UE Rank (e.g. a value of 1 or 2), reported by the user equipment 120 together with the CQI.

Instead of using static models, as discussed in the background section, for the selection of the user equipment and/or the target cell, it is has been proposed to use a self-learning algorithm. The self-learning algorithm advantageously overcome shortcoming of the static models, such as requirement to update the model, difficulty in finding the static model and low expected accuracy of static models.

Accordingly, it has been demonstrated that it is possible to predict, by machine learning methods, a throughput value for a user equipment at a certain point in time based on historical data and a set of parameters currently applying to a connection towards the user equipment.

The machine learning methods, such as the above mentioned self-learning algorithm, include one or more of the following prediction models: a Nonlinear Autoregressive Exogenous Model using a Wavelet Network as its nonlinearity estimator; a Nonlinear Autoregressive (NAR) model using a Neural Network Time Series, a feed-forward Neural Network with 10 or 15 neurons and one hidden layer, Support Vector Machine (SVM) and the like.

In a first use case, throughput prediction was studied. A machine learning method was evaluated, using one of the prediction models for all UEs in the system. The model was trained and updated offline, e.g. during night.

In a second use case, prediction of time for download of a file, e.g. using File-Transfer-Protocol (FTP) was studied. Two Machine Learning methods have been evaluated; a prediction model per cell, valid for all UEs in that cell and a prediction model per UE, valid for that particular UE during the lifetime of the connection.

Using the models, described in the two use cases above, a prediction of how long time a download of a file will last or which throughput a user equipment will experience.

Now returning to the fact that, as mentioned above, handover may be performed to provide load balancing and/or mobility.

For load balancing purposes, a load of a base station is measured. When the load exceeds a pre-configured threshold, a Mobility Load Balancing (MLB) procedure is triggered. The MLB procedure allows balancing, i.e. transfer of, the load to a neighbor cell of the same Radio Access Technology (RAT), a cell of another RAT or another frequency or the like.

Currently, Third Generation Partnership Project (3GPP), Technical Specification (TS) 36.423 X2AP, section 8.3.7 and section 8.2, specifies the following functions of the MLB procedure:

a load reporting function,
a load balancing function, and
a handover function.

The load reporting function includes an exchange of cell specific load information between neighbor base stations, such as enhanced NodeBs (eNBs), e.g. as exemplified in TS 36.423, X2AP, section 8.3.7 and 9.1.2.1.

The load balancing function describes decisions, by the base station, about which user equipments to be handed over and to which neighbor cells. This is sometimes referred to as UE selection and cell selection, respectively. These decisions are typically taken based mainly on the load information, provided by the load reporting function, and any available radio measurements performed by one or more user equipment served by a source base station.

A known exemplifying manner of performing the load balancing function is to effectively change size of a source cell operated by the source base station. For example, if the cell is overloaded, the size of the source cell may be decreased. This implies that user equipments at the outskirts of the source cell will be handed over to a neighbor cell, which size can be effectively increased. It is known to the change of the size of the cell by applying a handover (HO) offset. The source base station negotiates with a target base station, operating a target cell, for the HO offset settings to avoid handover Ping-Pong between the source and target cells. The agreed offset will be signaled to the user equipments served by the source base station.

Another known exemplifying manner of performing the load balancing function is to select a specific set of user equipments which should be handed over to one or more target cells, operated by one or more target base stations. The selection of the specific set of user equipments can take the following information into account: load and capacity of source and target cell, UE radio measurement reports, UE traffic characteristics, UE bearers information, historical/current resource utilization of the UE, UE subscription, profile. The UE traffic characteristics can be given as heavy or light data usage. The UE bearer information can be given as guaranteed bit-rate bearer or default bearer. The UE subscription profile may be given as gold, silver or bronze subscriber.

The handover function performs the handover of the selected user equipment from the source base station to the target base station. During execution of the handover function, mobility settings are negotiated between the source and target base stations. In this manner, it may be avoided that the selected user equipment is for example handed over back to the source base station as a consequence of its' mobility, when it initially was handed over to the target base station due to load balancing.

In 3GPP Radio Access Network 3 (RAN3), there is discussed how load balancing between 3GPP and Wireless Local Area Network (WLAN) can be performed while using some sort of throughput prediction.

In a recent contribution, identified as R3-142023, 3GPP Technical Study Group (TSG)-RAN Work Group (WG)3 #85 R3-142023, Dresden, Germany, 18-22 Aug. 2014, "Parameters Exchanged from the WLAN to the eNB", presented at RAN3#85, another use case for 3GPP WLAN interworking to help a radio access network to steer a user equipment back to cellular for better user experience was proposed. It was previously agreed to investigate the necessary information exchange between the radio access network of 3GPP and a WLAN to estimate throughput for the user equipment when served in the WLAN.

A list of parameters to be studied, which have been agreed as beneficial to exchange from the WLAN to the radio access network of 3GPP, has been agreed (R3-142023). In the following some of them are listed:

Base Station Subsystem (BSS) load: The BSS load element defined in [Institute of Electrical and Electronics Engineers (IEEE) Standard 802.11TM-2012, IEEE Standard for Information technology-Telecommunications and information exchange between systems-Local and metropolitan area network] contains three metrics: station count, channel utilization, and the available admission control. The three metrics are defined as following in [IEEE Standard 802.11TM-2012, IEEE Standard for Information technology-Telecommunications and information exchange between systems-Local and metropolitan area network].

The Station (STA) Count field is interpreted as an unsigned integer that indicates the total number of STAs currently associated with this BSS.

The Channel Utilization field is defined as the percentage of time, linearly scaled with 255 representing 100%, that the Access Point (AP) sensed the medium was busy, as indicated by either the physical or virtual carrier sense (CS) mechanism. When more than one channel is in use for the BSS, the Channel Utilization field value is calculated only for the primary channel. The computed formula is also available in [IEEE Standard 802.11TM-2012, IEEE Standard for Information technology-Telecommunications and information exchange between systems-Local and metropolitan area network].

The Available Admission Capacity field is 2 octets long and contains an unsigned integer that specifies the remaining amount of medium time available via explicit admission control, in units of 32 μs/s. The field is helpful for roaming STAs to select an Access Point (AP) that is likely to accept future admission control requests, but it does not represent an assurance that the Hybrid Coordinator (HC), e.g. at the AP, admits these requests.

WAN metrics: WAN metrics defined in [Wi-Fi Alliance® Technical Committee, Hotspot 2.0 Technical Task Group Hotspot 2.0 (Release 2) Technical Specification Version 3.11] includes the Downlink/Uplink speed and the Downlink/Uplink load, as following:

The Downlink Speed is a 4-octet positive integer whose value is an estimate of a WAN Backhaul link current downlink speed in kilobits per second. For backhaul links that do not vary in speed or those for which no accurate estimation can be made, this attribute contains the nominal speed.

The Uplink Speed is a 4-octet positive integer whose value is an estimate of the WAN Backhaul link's current uplink speed in kilobits per second. For backhaul links that do not vary in speed or those for which no accurate estimation can be made, this attribute contains the nominal speed.

The Downlink Load is a 1-octet positive integer representing the current percentage loading of the downlink WAN connection, scaled linearly with 255 representing 100%, as measured over an interval the duration of which is reported in Load Measurement Duration.

The Uplink Load is a 1-octet positive integer representing the current percentage loading of the uplink WAN connection, scaled linearly with 255 representing 100%, as measured over an interval the duration of which is reported in Load Measurement Duration.

Besides, it is noted that the backhaul available downlink bandwidth can be calculated as the Downlink Speed*(1−Downlink Load/255). And the backhaul available uplink bandwidth is defined similarly. The current backhaul speed/load or available bandwidth may limit the expected throughput for a new coming user equipment.

Average data rate for user equipments when served by WLAN APs: The average data rate in WLAN APs may calculate on downlink and uplink separately. For downlink, the user equipment average data rate in an AP may calculate as total data successfully sent out by the AP dividing the UE numbers and dividing the monitoring time. The calculation of uplink average data rate is similar. Besides, this metric may be calculated in different Received Channel Power Indicator (RCPI)/Received Signal-to-Noise Indicator (RSNI) level and in different Access Controllers (ACs) for Quality of Service (QoS) APs.

The AP divides reported RCPI/RSNI into several levels. For STAs belong to the same level of RCPI/RSNI, the AP calculates the average data rate separately. The RAN may compare the UE average data rate of each AP with the throughput obtained in the serving cell to determine if the AP is a candidate for offloading. This metric may be collected correlated with the RCPI/RSNI.

As mentioned above, it has, by 3GPP RAN3, been discussed which input parameters, herein exemplified as p1 ... pN, have to be reported to the radio access network such that it is able to estimate throughput in WLAN before taking a traffic steering decision. In that particular case, the decision is based on throughput prediction in WLAN versus the throughput measured in LTE.

For mobility purposes, a signal strength received at the user equipment from the source base station is measured. When the signal strength at the user equipment passes below a threshold value, the user equipment begins to search for one or more target base stations, to which it potentially can be handed over. In this case, the source base station decides to which target base station the user equipment is to be handed over.

The handover function will now be described in more detail with reference to FIGS. 3 and 4 in order to better appreciate the context of the embodiment described herein.

Figure 3:
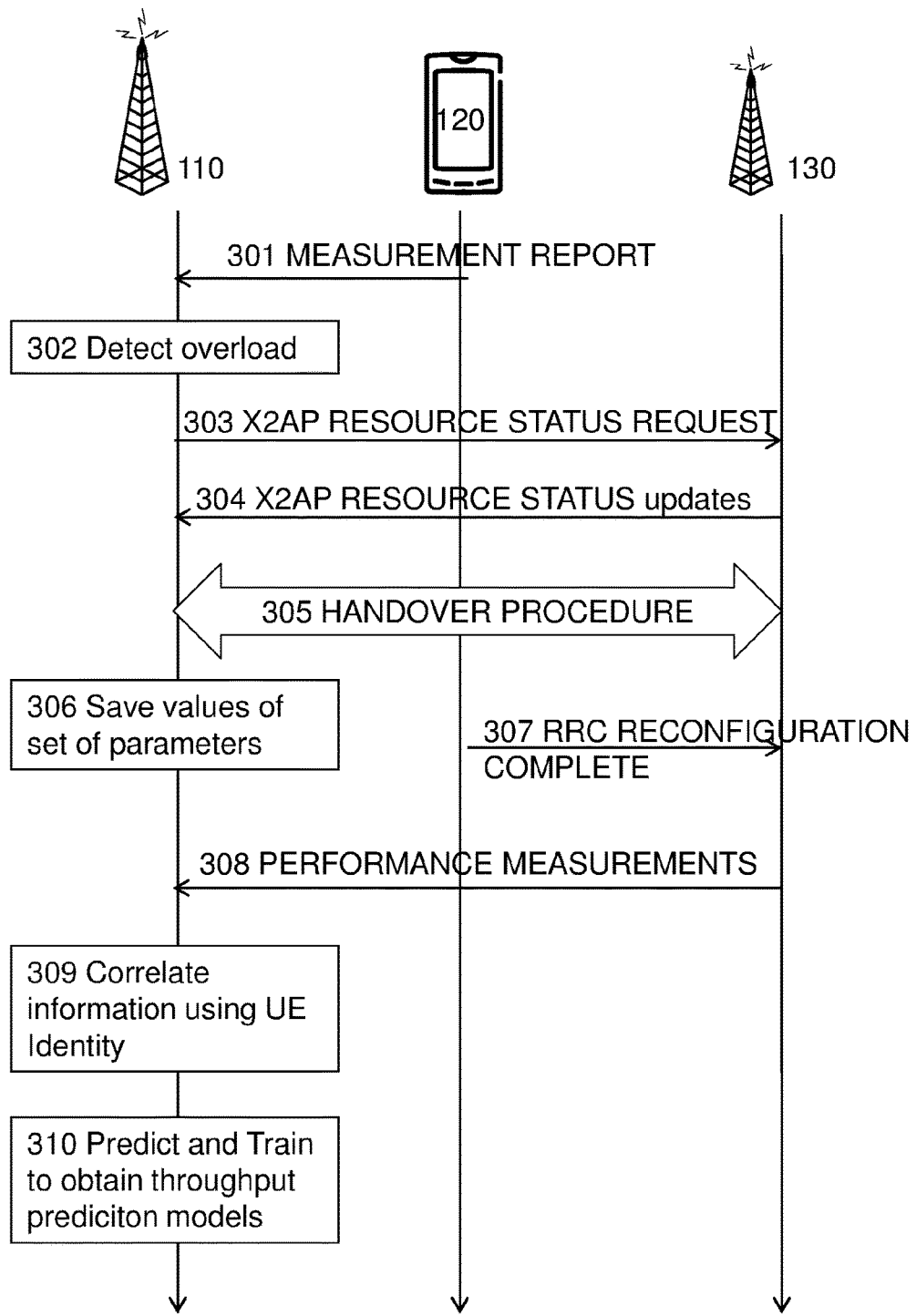
FIGS. 3 and 4 are flowcharts illustrating further details of the embodiments herein.

FIG. 3 illustrates a schematic combined signaling and flow chart according to embodiments herein. In this embodiment, the first radio network node 110 performs the training phase in order to build the set of models. In this example, the handover is triggered by that the first radio network node 110 becomes overloaded.

The following exemplifying actions are performed.

Action 301

The user equipment 120 sends a measurement report to the first radio network node 110. The measurement report may include one or more of RSRP, RSRQ, and the like, for the second radio network node 130.

Action 302

The first radio network node 110 detects overload. This may mean that the load on the first radio network node 110 is above a load threshold value. The load may be measured in terms of number of dropped packets, number of served user equipments, total throughput for a cell operated by the first radio network node 110, etc.

Action 302 may be performed before action 301.

Action 303

The first radio network node 110 sends a X2AP RESOURCE STATUS REQUEST, e.g. in response to action 302, i.e. when overload is detected.

Action 304

The second radio network node 130 sends a X2AP RESOURCE STATUS update.

Action 305

Part of the handover function is executed.

Action 306

The first radio network node 110 saves values of the set of parameters. The first radio network node 110 may store the values of the set of parameters during a number of seconds, e.g. up until action 310 has been performed.

Thereafter, UE context in case of LTE may be released. This action may be performed before action 305.

Action 307

The user equipment 120 sends a RRC RECONFIGURATION COMPLETE message to the second radio network node 130, whereby it is signaled that the handover is completed.

Action 308

The second radio network node 130 sends a report about performance measurements. The report includes a quality of service value, being an actual QoS obtained for the user equipment after the handover. This action is performed after action 307.

It may here be mentioned that, in 2010, the Next Generation of Network Management (NGNM) forum issued a recommendation concerning the monitoring of throughput before/after handovers. In addition to that, 3GPP working group (WG) RAN3 proposed to discuss solutions to enable post-handover throughput monitoring for non-GBR bearers [R3-141113]. With the embodiments herein, the report generally includes QoS parameters, possibly excluding the throughput, which is mentioned in the above documents.

Action 309

The first radio network node 110 correlates the received performance measurements with the saved values of the set of parameters by use of an identity, which uniquely identifies the user equipment 120.

Action 310

At least one model that uses at least a sub-set of the available parameters of the set is trained to predict the actual QoS.

Figure 4:
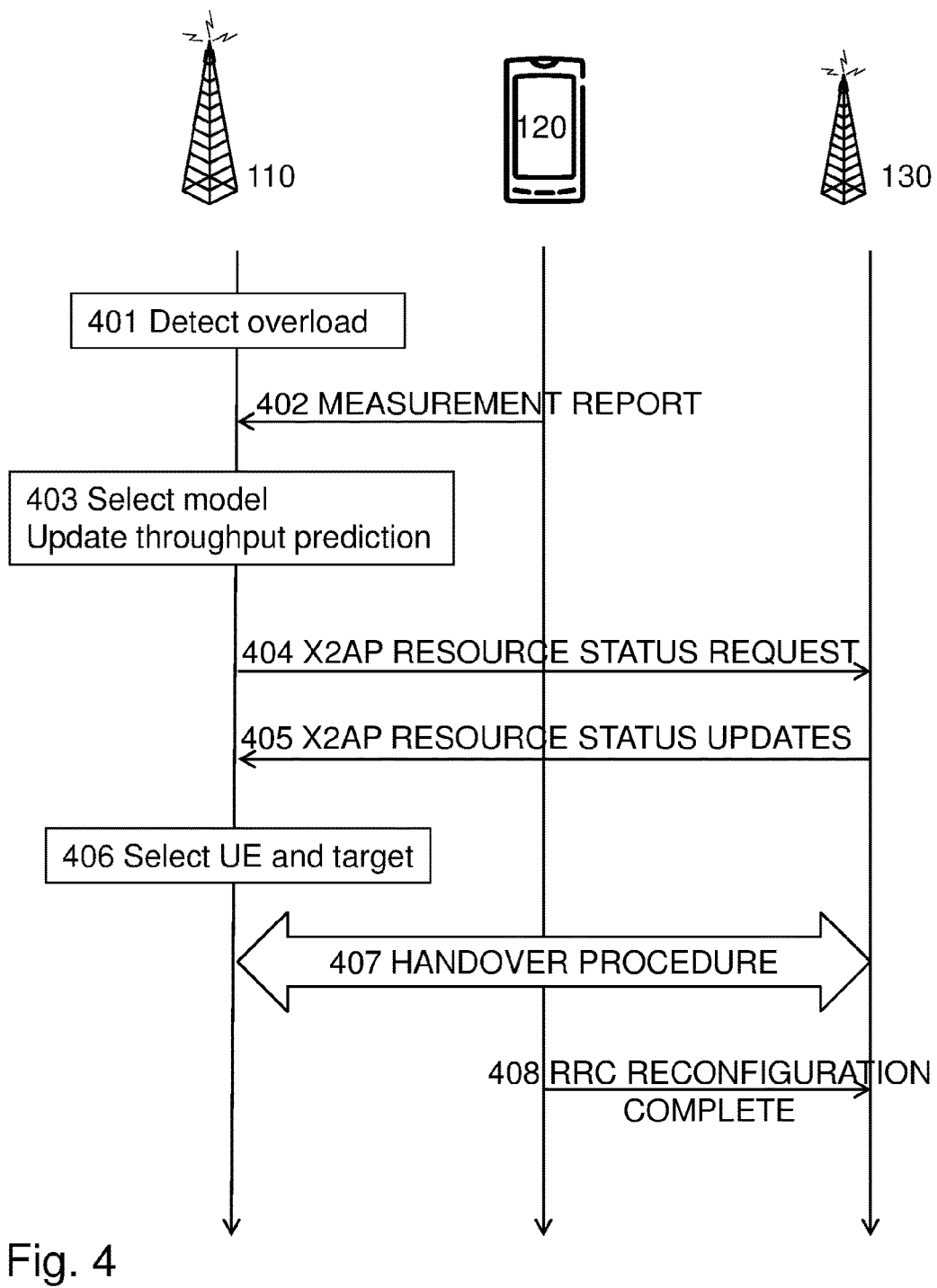

FIG. 4 illustrates a schematic combined signaling and flow chart according to embodiments herein. In this embodiment, the first radio network node 110 performs the execution phase, thereby enhancing the handover procedure. In this example, the handover is trigger by that the first radio network node 110 becomes overloaded.

The following exemplifying actions are performed.

Action 401

The first radio network node 110 detects overload. This may mean that the load on the first radio network node 110 is above a load threshold value.

Action 402

The user equipment 120 sends a measurement report to the first radio network node 110. The measurement report may include one or more of RSRP, RSRQ, and the like, for the second radio network node 130.

Action 402 may be performed before action 401.

Action 403

The first radio network node 110 selects a model.

Action 404

The first radio network node 110 sends a X2AP RESOURCE STATUS REQUEST. The RESOURCE STATUS REQUEST may be adapted to the selected model, i.e. only those parameters used by the model are requested. In this manner, valuable bandwidth may be saved, since parameters not used by the model will not be send in the subsequent RESOURCE STATUS UPDATE in action 405.

Action 405

The second radio network node 130 sends one or more X2AP RESOURCE STATUS UPDATES.

Action 406

The first radio network node 110 selects the user equipment 120 to be handed over and to which target radio network node to hand it over.

Action 407

Part of the handover function is executed.

Action 408

The user equipment 120 sends a RRC RECONFIGURATION COMPLETE message to the second radio network node 130, whereby it is signaled that the handover is completed.

Figure 5:
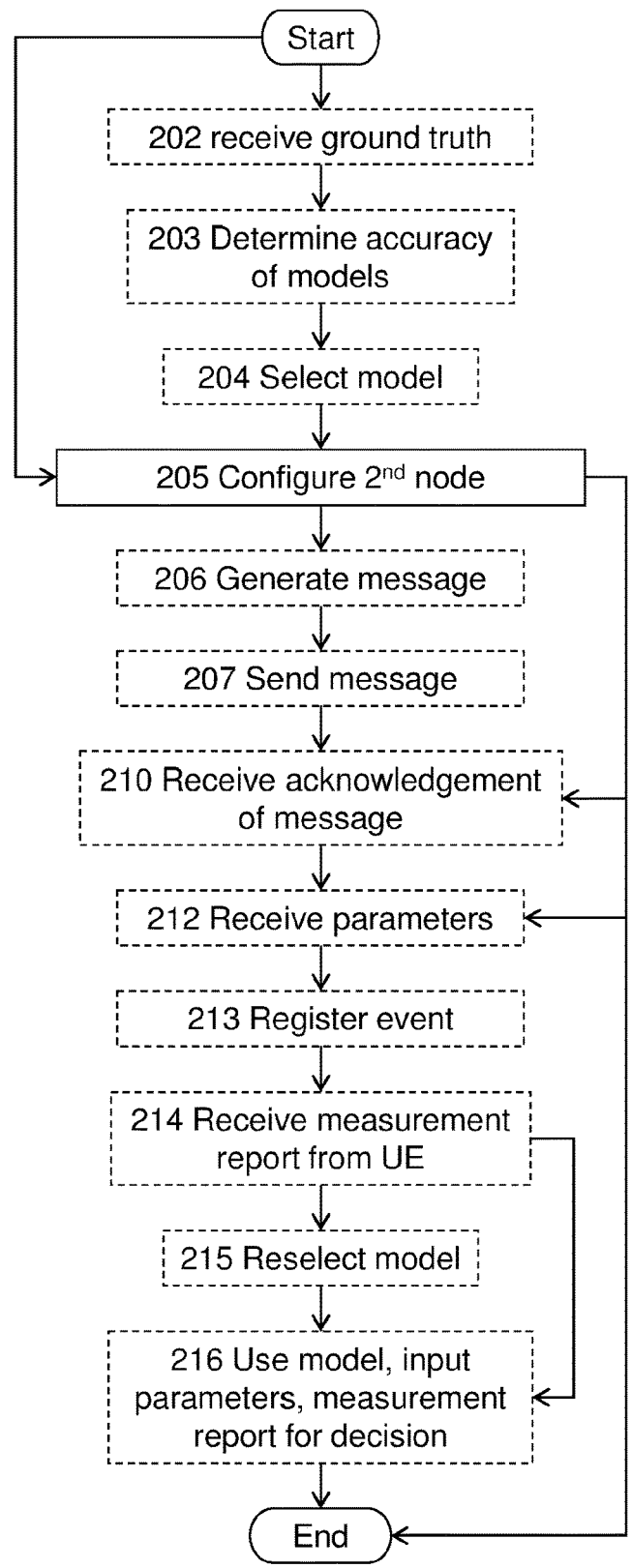
FIG. 5 is a schematic flowchart illustrating an embodiment of the method when performed by the first radio network node.

In FIG. 5, a schematic flowchart of exemplifying methods in the central network node 111 is shown. Again, the same reference numerals as above have been used to denote the same or similar features, in particular the same reference numerals have been used to denote the same or similar actions. Thus, the first radio network node 110 performs a method for managing input parameters to a set of models for prediction of a quality of service of a user equipment 120.

As mentioned, the first radio network node 110 operates the set of models for prediction of the quality of service. The quality of service relates to when the user equipment 120 is served by a second radio network node 130 after a handover from the first radio network node 110 to the second radio network node 130.

One or more of the following actions may be performed in any suitable order. Notably, actions that are not performed by the first radio network node 110 are not described here.

After an initial handover, action 202-204 may be performed.

Action 202

The first radio network node 110 may receive a ground truth corresponding to the quality of service to be predicted by use of the set of models.

Action 203

The first radio network node 110 may determine a respective value of accuracy for each of the models based on a difference between the ground truth and a respective quality of service predicted by use of a corresponding model.

The respective value of accuracy may be weighted in dependence of a number of input parameters for the corresponding model.

Action 204

The first radio network node 110 may select at least one corresponding model for which the respective value of accuracy is above a threshold value for accuracy of model.

Action 205

The first radio network node 110 configures the second radio network node 130 to report the input parameters at least once before the handover, wherein the input parameters are usable by the first radio network node 110 when predicting, by use of the set of models, the quality of service.

The input parameters may comprise one or more of:
a load parameter relating to load in the second radio network node 130,
a capability information relating to capability of the user equipment 120,
a channel quality indicator parameter relating to one or more channel quality indicators reported by the user equipment 120,
a rank parameter relating to rank a connection to the user equipment 120,
a signal strength parameter relating to received signal strength reported by the user equipment 120,
an amount parameter relating to an amount of user equipments served by the first radio network node 110,
a resource parameter relating to utilization of physical resource blocks,
a bearer parameter relating to a bearer type of a bearer associated to the user equipment 120, and the like.

Action 205 may include action 206 and 207.

Action 206

The first radio network node 110 may generate a message indicating the input parameters to be reported by the second radio network node 130.

The generation of the message may comprise restricting the message to indicate only a subset of the input parameters, wherein the subset of the input parameters is given by the selected at least one corresponding model.

The message may include one or more of:
an indication representing a specific set of input parameters,
one indication for each input parameter to be reported by the second radio network node 130;
a respective name of each input parameter to be reported by the second radio network node 130; and the like.

Action 207

The first radio network node 110 may send the message to the second radio network node 130, thereby configuring the second radio network node 130 to report the input parameters at least once before the handover.

Action 210

The first radio network node 110 may receive, from the second radio network node 130, the acknowledgment. Thus, the first radio network node 110 will, unless errors occur, be able to use the model selected in action 204 in an upcoming handover.

Action 212

The first radio network node 110 may receive the input parameters from the second radio network node 130.

Action 213

The first radio network node 110 may register an event for triggering sending, by the user equipments 120, 121, of measurement reports, wherein the measurement reports may be used in a decision concerning which user equipment 120, 121 and which second radio network node 130 to involve in the handover.

The event may indicate overload of the first radio network node 110, or the event may indicate that signal strength received at, or by, at least one user equipment 120, 121 is below a threshold value.

Action 214

The first radio network node 110 may receive at least one measurement report from the user equipment 120, 121.

Action 215

The first radio network node 110 may reselect at least one reselected corresponding model out of the set of models according to number of input parameters and type of input parameters among the received input parameters. The use of the reselected model may comprise using the at least one reselected corresponding model, the input parameters and the measurement report when making the decision.

Action 216

The first radio network node 110 may use the at least one selected corresponding model, the input parameters and the measurement report when making the decision.

Figure 6:
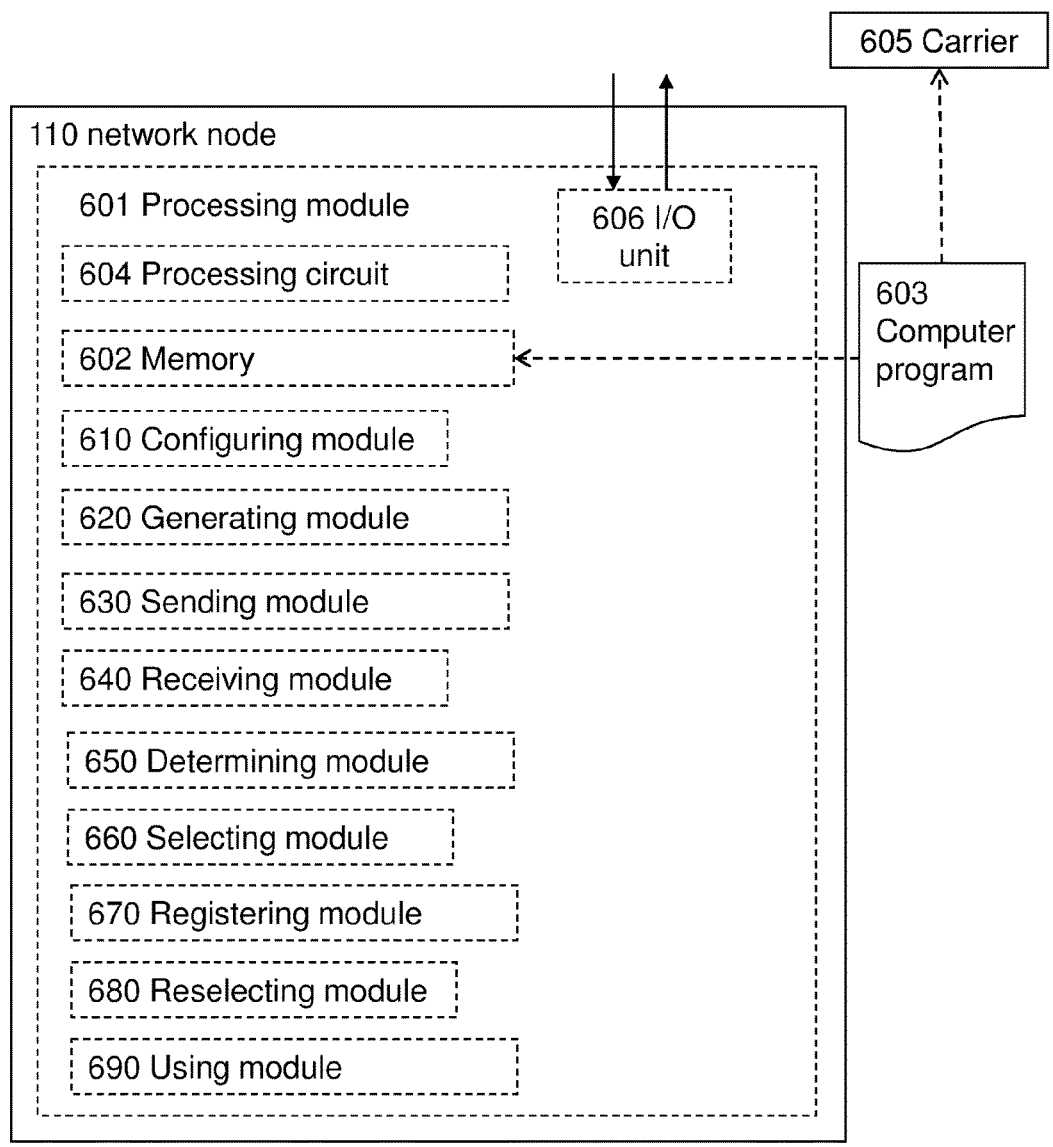
FIG. 6 is a block diagram illustrating embodiments of the network node.

With reference to FIG. 6, a schematic block diagram of embodiments of the first radio network node 110 of FIG. 1 is shown. The first radio network node 110 is thus configured to manage input parameters to a set of models for prediction of a quality of service of a user equipment 120.

As mentioned, the first radio network node 110 is capable of operating the set of models for prediction of the quality of service. The quality of service relates to when the user equipment 120 is served by a second radio network node 130 after a handover from the first radio network node 110 to the second radio network node 130, The first radio network node 110 may comprise a processing module 601, such as a means, one or more hardware modules and/or one or more software modules for performing the methods described herein.

The first radio network node 110 may further comprise a memory 602. The memory may comprise, such as contain or store, a computer program 603.

According to some embodiments herein, the processing module 601 comprises, e.g. 'is embodied in the form of' or 'realized by', a processing circuit 604 as an exemplifying hardware module. In these embodiments, the memory 602 may comprise the computer program 603, comprising computer readable code units executable by the processing circuit 604, whereby the first radio network node 110 is operative to perform the methods of FIG. 2 and/or FIG. 5.

In some other embodiments, the computer readable code units may cause the first radio network node 110 to perform the method according to FIGS. 2 and/or 5 when the computer readable code units are executed by the first radio network node 110.

FIG. 6 further illustrates a carrier 605, comprising the computer program 603 as described directly above. The carrier 605 may be one of an electronic signal, an optical signal, a radio signal, and a computer readable medium.

In some embodiments, the processing module 601 comprises an Input/Output module 606, which may be exemplified by a receiving module and/or a sending module as described below when applicable.

In further embodiments, the processing module 601 may comprise one or more of a configuring module 610, a generating module 620, a sending module 630, a receiving module 640, a determining module 650, a selecting module 660, a registering module 670, a reselecting module 680 and a using module 690 as exemplifying software modules. In other examples, one or more of the aforementioned exemplifying software modules may be implemented as one or more hardware modules.

Therefore, according to the various embodiments described above, the first radio network node 110 is operative to and/or the first radio network node 110, the processing module 601 and/or the configuring module 610 is configured to configure the second radio network node 130 to report the input parameters at least once before the handover, wherein the input parameters are usable by the first radio network node 110 when predicting, by use of the set of models, the quality of service.

The first radio network node 110 may be operative to and/or the first radio network node 110, the processing module 601 and/or the generating module 620 may be configured to generate a message indicating the input parameters to be reported by the second radio network node 130.

The first radio network node 110 may be operative to and/or the first radio network node 110, the processing module 601 and/or the generating module 620 may be configured to generate the message by restricting the message to indicate only a subset of the input parameters. The subset of the input parameters is given by the selected at least one corresponding model.

Furthermore, the first radio network node 110 may be operative to and/or the first radio network node 110, the processing module 601 and/or the sending module 630 may be configured to send the message to the second radio network node 130, thereby configuring the second radio network node 130 to report the input parameters at least once before the handover.

The message may include one or more of:
an indication representing a specific set of input parameters,
one indication for each input parameter to be reported by the second radio network node 130;
a respective name of each input parameter to be reported by the second radio network node 130; and the like.

The input parameters may comprise one or more of:
a load parameter relating to load in the second radio network node 130,
a capability information relating to capability of the user equipment 120,
a channel quality indicator parameter relating to one or more channel quality indicators reported by the user equipment 120,
a rank parameter relating to rank a connection to the user equipment 120,
a signal strength parameter relating to received signal strength reported by the user equipment 120,
an amount parameter relating to an amount of user equipments served by the first radio network node 110,
a resource parameter relating to utilization of physical resource blocks,
a bearer parameter relating to a bearer type of a bearer associated to the user equipment 120, and the like.

Moreover, the first radio network node 110 may be operative to and/or the first radio network node 110, the processing module 601 and/or the receiving module 640 may be configured to, after an initial handover, receive a ground truth corresponding to the quality of service to be predicted by use of the set of models;

Additionally, the first radio network node 110 may be operative to and/or the first radio network node 110, the processing module 601 and/or the determining module 650 may be configured to, after an initial handover, determine a respective value of accuracy for each of the models based on a difference between the ground truth and a respective quality of service predicted by use of a corresponding model. The respective value of accuracy may be weighted in dependence of a number of input parameters for the corresponding model.

Furthermore, the first radio network node 110 may be operative to and/or the first radio network node 110, the processing module 601 and/or the selecting module 660 may be configured to, after an initial handover, select at least one corresponding model for which the respective value of accuracy is above a threshold value for accuracy of model.

The first radio network node 110 may be operative to and/or the first radio network node 110, the processing module 601 and/or the receiving module 640, or another receiving module (not shown), may be configured to receive the input parameters from the second radio network node 130.

The first radio network node 110 may be operative to and/or the first radio network node 110, the processing module 601 and/or the registering module 670 may be configured to register an event for triggering sending, by the user equipments 120, 121, of measurement reports. The measurement reports may be used in a decision concerning which user equipment 120, 121 and which second radio network node 130 to involve in the handover. The event may indicate overload of the first radio network node 110, or the event may indicate that signal strength received at at least one user equipment 120, 121 is below a threshold value.

The first radio network node 110 may be operative to and/or the first radio network node 110, the processing module 601 and/or the receiving module 640, or yet another receiving module (not shown), may be configured to receive at least one measurement report from the user equipment 120, 121.

Moreover, the first radio network node 110 may be operative to and/or the first radio network node 110, the processing module 601 and/or the using module 690 may be configured to use the at least one selected corresponding model, the input parameters and the measurement report when making the decision.

The first radio network node 110 may be operative to and/or the first radio network node 110, the processing module 601 and/or the reselecting module 680 may be configured to reselect at least one reselected corresponding model out of the set of models according to number of input parameters and type of input parameters among the received input parameters. The first radio network node 110 may be configured to use the at least one reselected corresponding model, the input parameters and the measurement report when making the decision.

As used herein, the term "processing module" may include one or more hardware modules, one or more software modules or a combination thereof. Any such module, be it a hardware, a software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first radio network node, for managing input parameters to a set of models for prediction of a quality of service of a user equipment, wherein the first radio network node operates the set of models for prediction of the quality of service, wherein the quality of service relates to when the user equipment is served by a second radio network node after a handover from the first radio network node to the second radio network node, wherein the method comprises:
configuring the second radio network node to report the input parameters at least once before the handover, wherein the input parameters are usable by the first radio network node when predicting, by use of the set of models, the quality of service.

2. The method of claim 1, wherein the configuring comprises:
generating a message indicating the input parameters to be reported by the second radio network node; and
sending the message to the second radio network node, thereby configuring the second radio network node to report the input parameters at least once before the handover.

3. The method of claim 2, wherein the method comprises, after an initial handover:
receiving a ground truth corresponding to the quality of service to be predicted by use of the set of models wherein the ground truth representing a target value, relating to the quality of service;
determining a respective value of accuracy for each of the models based on a difference between the ground truth and a respective quality of service predicted by use of a corresponding model; and
selecting at least one corresponding model for which the respective value of accuracy is above a threshold value for accuracy of model.

4. The method of claim 3, wherein the generation of the message comprises restricting the message to indicate only a subset of the input parameters, wherein the subset of the input parameters is given by the selected at least one corresponding model.

5. The method of claim 3, wherein the respective value of accuracy is weighted in dependence on a number of input parameters for the corresponding model.

6. The method of claim 2, wherein the message includes one or more of:
an indication representing a specific set of input parameters,
one indication for each input parameter to be reported by the second radio network node; and
a respective name of each input parameter to be reported by the second radio network node.

7. The method of claim 1, wherein the method comprises:
receiving the input parameters from the second radio network node;
registering an event for triggering sending, by the user equipments, of measurement reports, wherein the measurement reports are used in a decision concerning which user equipment and which second radio network node to involve in the handover;

receiving at least one measurement report from the user equipment; and using the at least one selected corresponding model, the input parameters and the measurement report when making the decision.

8. The method of claim 7, wherein the event indicates overload of the first radio network node, or wherein the event indicates that signal strength received at at least one user equipment is below a threshold value.

9. The method of claim 1, wherein the method comprises:
reselecting at least one reselected corresponding model out of the set of models according to number of input parameters and type of input parameters among the received input parameters; and wherein the using comprises using the at least one reselected corresponding model, the input parameters and the measurement report when making the decision.

10. The method of claim 1, wherein the input parameters comprise one or more of:
a load parameter relating to load in the second radio network node,
a capability information relating to capability of the user equipment,
a channel quality indicator parameter relating to one or more channel quality indicators reported by the user equipment,
a rank parameter relating to the rank of a connection to the user equipment,
a signal strength parameter relating to received signal strength reported by the user equipment,
an amount parameter relating to an amount of user equipments served by the first radio network node,
a resource parameter relating to utilization of physical resource blocks,
a bearer parameter relating to a bearer type of a bearer associated to the user equipment.

11. A first radio network node configured to manage input parameters to a set of models for prediction of a quality of service of a user equipment, wherein the first radio network node is capable of operating the set of models for prediction of the quality of service, wherein the quality of service relates to when the user equipment is served by a second radio network node after a handover from the first radio network node to the second radio network node, wherein the first radio network node comprises a processing circuit and memory operatively connected to the processing circuit, wherein the memory stores computer program for execution by the processing circuit whereby the processing circuit is configured to:
configure the second radio network node to report the input parameters at least once before the handover, wherein the input parameters are usable by the first radio network node when predicting, by use of the set of models, the quality of service.

12. The first radio network node of claim 11, wherein the processing circuit is configured to:
generate a message indicating the input parameters to be reported by the second radio network node; and
send the message to the second radio network node, thereby configuring the second radio network node to report the input parameters at least once before the handover.

13. The first radio network node of claim 12, wherein the processing circuit is configured to, after an initial handover:

receive a ground truth corresponding to the quality of service to be predicted by use of the set of models wherein the ground truth represents a target value, relating to the quality of service;

determine a respective value of accuracy for each of the models based on a difference between the ground truth and a respective quality of service predicted by use of a corresponding model; and select at least one corresponding model for which the respective value of accuracy is above a threshold value for accuracy of model.

14. The first radio network node of claim 13, wherein the processing circuit is configured to generate the message by restricting the message to indicate only a subset of the input parameters, wherein the subset of the input parameters is given by the selected at least one corresponding model.

15. The first radio network node of claim 13, wherein the respective value of accuracy is weighted in dependence of a number of input parameters for the corresponding model.

16. The first radio network node of claim 12, wherein the message includes one or more of:
an indication representing a specific set of input parameters,
one indication for each input parameter to be reported by the second radio network node; and
a respective name of each input parameter to be reported by the second radio network node.

17. The first radio network node of claim 11, wherein the processing circuit is configured to:
receive the input parameters from the second radio network node;
register an event for triggering sending, by the user equipments, of measurement reports, wherein the measurement reports are used in a decision concerning which user equipment and which second radio network node to involve in the handover;
receive at least one measurement report from the user equipment; and
use the at least one selected corresponding model, the input parameters and the measurement report when making the decision.

18. The first radio network node of claim 17, wherein the event indicates overload of the first radio network node, or wherein the event indicates that signal strength received at at least one user equipment is below a threshold value.

19. The first radio network node of claim 11, wherein the processing circuit is configured to:
reselect at least one reselected corresponding model out of the set of models according to number of input parameters and type of input parameters among the received input parameters; and wherein the first radio network node is configured to use the at least one reselected corresponding model, the input parameters and the measurement report when making the decision.

20. The first radio network node of claim 11, wherein the input parameters comprise one or more of:
a load parameter relating to load in the second radio network node,
a capability information relating to capability of the user equipment,
a channel quality indicator parameter relating to one or more channel quality indicators reported by the user equipment,
a rank parameter relating to the rank of a connection to the user equipment,
a signal strength parameter relating to received signal strength reported by the user equipment, an amount parameter relating to an amount of user equipments served by the first radio network node, a resource parameter relating to utilization of physical resource blocks, a bearer parameter relating to a bearer type of a bearer associated to the user equipment.

* * * * *

UNITED STATES PATENT AND TRADEMARK OFFICE
CERTIFICATE OF CORRECTION

PATENT NO. : 10,313,937 B2
APPLICATION NO. : 15/524523
DATED : June 4, 2019
INVENTOR(S) : da Silva et al.

Page 1 of 1

It is certified that error appears in the above-identified patent and that said Letters Patent is hereby corrected as shown below:

In the Specification

In Column 6, Line 32, delete "f_i2, f_in}," and insert -- "f_i2, ..., f_in}, --, therefor.

In Column 6, Line 40, delete "M1" and insert -- M_1 --, therefor.

In Column 6, Line 43, delete "M4=>f_4{f_41, f_42}=>e4" and insert -- M_4=>f_4{f_41, f_42}=>e_4. --, therefor.

In Column 8, Line 24, delete "(p1,pN) index=N+1," and insert -- (p1,pN) → index=N+1, --, therefor.

In Column 9, Line 44, delete "p1 pN" and insert -- p1...pN --, therefor.

In Column 10, Line 2, delete "TT's" and insert -- TTI's --, therefor.

In Column 10, Lines 26-30, delete "Autoregressive Exogenous..........and the like." and insert the same at Line 25, after "Nonlinear" as a continuation paragraph.

In Column 12, Line 24, delete "ρs/s." and insert -- µs/s. --, therefor.

Signed and Sealed this
Twenty-ninth Day of October, 2019

Andrei Iancu
*Director of the United States Patent and Trademark Office*